United States Patent [19]
Imafuji et al.

[11] Patent Number: 5,819,119
[45] Date of Patent: Oct. 6, 1998

[54] CAMERA WITH A VISUAL LINE POSITION DETECTION DEVICE AND METHOD

[75] Inventors: Kazuharu Imafuji; Hidehiro Ogawa; Toru Kosaka; Yoshio Matsuzawa, all of Kanagawa-ken, Japan

[73] Assignee: Nikon Corporation, Tokyo, Japan

[21] Appl. No.: 791,729

[22] Filed: Jan. 31, 1997

Related U.S. Application Data

[63] Continuation of Ser. No. 425,506, Apr. 20, 1995, abandoned.

[30] Foreign Application Priority Data

May 18, 1994 [JP] Japan ................................. 6-103991

[51] Int. Cl.$^6$ .............................. G03B 7/00; G03B 13/00
[52] U.S. Cl. ............................ 396/51; 396/148; 396/123
[58] Field of Search .............................. 396/51, 121, 123, 396/147, 148, 296

[56] References Cited

U.S. PATENT DOCUMENTS

| | | | |
|---|---|---|---|
| 4,827,303 | 5/1989 | Tsuboi ...................................... | 354/409 |
| 4,962,400 | 10/1990 | Otani et al. ............................. | 354/432 |
| 5,036,347 | 7/1991 | Tsunekawa et al. ..................... | 354/400 |
| 5,227,830 | 7/1993 | Yoshihara et al. ....................... | 354/432 |
| 5,296,888 | 3/1994 | Yamada .................................... | 354/432 |
| 5,333,029 | 7/1994 | Uchiyama et al. ...................... | 354/432 |
| 5,365,302 | 11/1994 | Kodama .................................. | 354/409 |
| 5,373,340 | 12/1994 | Takagi ..................................... | 354/432 |
| 5,473,403 | 12/1995 | Suda et al. .............................. | 354/409 |
| 5,563,676 | 10/1996 | Kosaka et al. ........................... | 396/51 |
| 5,634,141 | 5/1997 | Akashi et al. ............................ | 396/51 |

*Primary Examiner*—Safet Metjahic
*Assistant Examiner*—Michael Dalakis
*Attorney, Agent, or Firm*—Oliff & Berridge

[57] ABSTRACT

A camera with a visual line position detection device is capable of shortening the time required for auto focus detection and capable of more accurate selection of the focus detection point. The camera includes a focus detection device to output the results of distance measurements at a plurality of points where focus detection is possible and to detect focus for one of these points. A liquid crystal display device displays on a screen specified symbols overlapping the subject image on the positions corresponding to each of the points. A microprocessor accepts the results of the distance measurements from the focus detection system and selects one of the points based on the photographer visual line position as the point for focus detection among all the points whose distances are measured and on which focus detection is possible, excluding the points with an infinite focus distance.

23 Claims, 7 Drawing Sheets

CAMERA WITH A VISUAL LINE POSITION DETECTION DEVICE AND METHOD

This is a continuation of application Ser. No. 08/425,506 filed Apr. 20, 1995 now abandoned.

FIELD OF THE INVENTION

The present invention relates to a camera with a visual line position detection device, including a camera capable of executing auto focus detection, auto exposure, and switching of the shooting mode based on a photographer visual line detected by the visual line position detection device.

DESCRIPTION OF RELATED ART

In recent years, cameras have become more multi-functional and more automated with the development of electronic circuits and photoelectric conversion devices. Today, most cameras are equipped with auto exposure and auto focus detection functions. With such automation and multi-functionality of cameras, a photographer with little experience and without advanced photographic skills can produce high quality photographs.

On the other hand, because of the automation and multi-functionality of cameras, shooting action is quite often restricted. For example, cameras are structured such that functions such as auto exposure and auto focus detection are enabled in only a portion of the shooting field.

There are conventional cameras wherein the shooting field of a camera, for example, is divided into several areas, and an area is selected for appropriate exposure setting based on the absolute value of the photometric value of each area or on the difference between the photometric value with other areas. This technique, known as multi-photometry, enables setting of the appropriate exposure for almost any subject.

Most conventional auto focus detection technologies enable auto focus detection only in the central area of the shooting field. Thus, when a subject on which focus detection is desired is not in the middle of the shooting field, a complicated shooting procedure is required in which focus detection is executed with the desired subject in the middle, and the picture is taken by changing the framing without changing the focus.

To cope with a situation like the one described above, recent cameras provide several points on which auto focus detection is possible in the shooting field for the photographer to choose from and enable auto focus detection on the selected points.

As for methods to select points on which auto focus detection is possible, there is a method, for example, wherein the distance to each point is measured and selection is done automatically by a computer based on the results of the distance measurements. Another method is known in which a photographer, while looking through the shooting field, selects a point on which auto focus detection is possible using an input means such as a command dial, etc.

Also, a method has been used in which a visual line position detection device is provided in a camera to detect a photographer's visual line, a point on which auto focus detection is possible being selected from the points on the detected visual line position on which auto focus detection is possible. In this method, the photographer, while looking through a finder, aligns his vision on a point on which the photographer desires to focus and on which auto focus detection is possible. The visual line position detection device detects the visual line position of the photographer, and the camera selects the point, for example, in the vicinity of the detected visual line position on which auto focus detection is possible.

A visual line position detection device is also used in applications other than selection of points on which auto focus detection is possible. For example, a technique is proposed wherein various areas are provided in the screen field of a camera, and when the photographer aligns his vision on one of the areas, settings and setting changes related to the shooting operation of a camera such as exposure mode and shutter speed are executed.

Visual line position detection devices using either points or areas may be generally described as devices that determine where in the shooting field focus detection will be performed.

With the conventional technique described above wherein a point on which auto focus detection is possible is selected by a visual line position detection device, usually, all the points on which auto focus detection is possible are targeted for selection, one point being selected from among them. Thus, even when all points are found to be at infinity as a result of the distance measurement of the auto focus detection point, the focusing action is not completed until the visual line position of the photographer is detected, which delays the time until the subject is finally focused.

Moreover, in the case of shooting a portrait, a person is surrounded by background scenery. In general, if the scenery is relatively close, the person is focused, and the scenery behind is not focused. However, even in such a case, conventional techniques target all the points on which auto focus is possible, including points positioned on the background scenery, and one point is chosen among them by detecting the visual line position of the photographer.

Thus, in a situation where a point on a person and a point on the background scenery among the points on which auto focus detection is possible are adjacent each other, if there is a detection error in the visual line position detection device or if the photographer aligns his vision on an unintended point (point other than those located on the person), a point on the background scenery may be erroneously chosen, resulting in a photograph with a blurred image of the person.

SUMMARY OF THE INVENTION

In view of the problems described above, an object of the present invention is to provide a camera with a visual line position detection device that shortens the time necessary to complete focus detection by controlling the operation of the visual line position detection device to select the focus detection point, enabling accurate selection of the point intended by the photographer.

With a camera endowed with the visual line position detection device of the present invention, a focus detection device has a multiplicity of points within the shooting field on which focus detection is possible. A display device displays symbols with predetermined shapes on locations corresponding to each point where focus detection is possible on the screen overlapping the subject.

The visual line position detection device detects the visual line of the photographer aligning his vision on a section of the screen on which a multiplicity of the symbols and the subject image are displayed overlapping each other. A selection device receives the output from the visual line detection device and, based upon the output, selects a point on which the photographer appears to be aligning his vision. The visual line position detection device then outputs a selection signal to the auto focus detection device specifying the point where focus detection is possible corresponding to the symbol. Next, based upon the selection signal, the auto focus detection device detects the focus for one point among the points where focus detection is possible.

With the present invention, prior to the process to select the focus detection point described above, the auto focus detection device measures the distance to the subject at each point on which focus detection is possible by obtaining, for example, the defocus amount, and outputs the results. A control device then receives the results of the distance measurement and determines whether more than one point has a distance longer than a predetermined value.

As a result, if there is more than one point where focus detection is possible with a measured distance for the focus distance longer than the predetermined value, the control device controls the selection device to designate points other than those with a longer distance than the predetermined value as selectable points to be selected by the visual line position detection device and to select one point from among the selectable points.

BRIEF DESCRIPTION OF THE DRAWINGS

The invention will be described in detail with reference to the following figures in which like reference numerals refer to like elements, and wherein.

DETAILED DESCRIPTION OF PREFERRED EMBODIMENTS

An embodiment of a camera with a visual line position detection device in which the present invention is applied is described hereafter, with reference to the drawings. The present embodiment is an example in which the present invention is applied to a single-lens reflex camera, the optical structure of the present embodiment being illustrated in FIG. 1.

Figure 1:
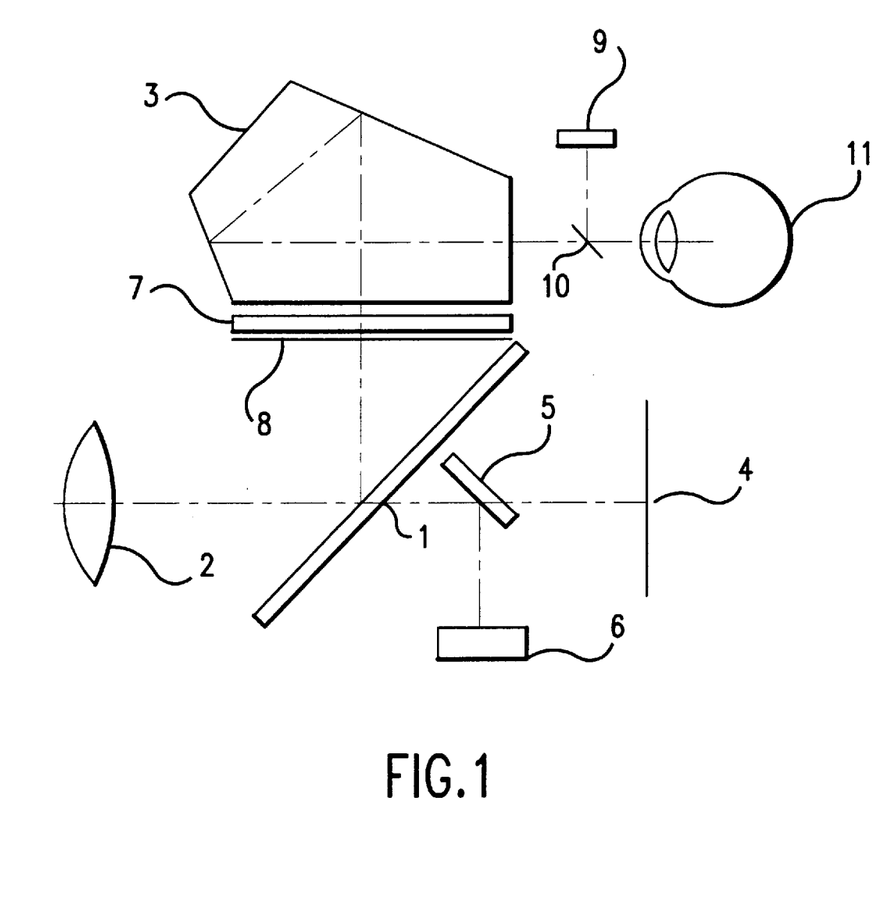
FIG. 1 is a drawing illustrating a section of an optical system in an embodiment for which the present invention is applied to a single-lens reflex camera.

As illustrated in FIG. 1, a camera according to the present invention comprises a shooting lens 2 for receiving the subject image, a main mirror 1 to reflect a portion of the light passing through the shooting lens 2, a shooting screen 7 placed in a position where the light guided by the main mirror 1 is composed, and a liquid crystal display device 8 to display predetermined symbols on the screen 7 to indicate the photographer's shooting operation setting conditions and points on which auto focus detection is possible, as explained hereafter.

The present embodiment further comprises a pentagonal prism 3 that guides the light reflected by the main mirror 1 toward an unpresented finder, a visual line position detection device 9 equipped with a light emitting unit and a light receiving unit to detect the photographer visual line position, a half-mirror 10 that combines and reflects the light from the light emitting unit of the visual line position detection device 9 and the light from the pentagonal prism 3 to the eye 11 of the photographer, an auto focus detection device 6 with a multiplicity of points on which auto focus adjustment is possible, and a sub-mirror 5 that guides light passing through the main mirror 1 to the auto focus detection device 6.

The main mirror 1 usually reflects the light passing through the shooting lens 2 toward the pentagonal prism 3, but during shooting the main mirror 1 retracts from its normal position so that light passes through the shooting lens 2 to the film surface 4.

The visual line position detection device 9 optically detects the direction of the visual axis of the eye section (eye ball) 11 and comprises, for example, a light emitting unit equipped with an LED to generate light to be projected on the eye 11, a light receiving unit equipped with a CCD to detect light reflected by the eye 11, and a visual line algorithm unit to determine and output the photographer visual line position by converting the output signals from the light receiving unit to positions on the screen. The visual line position detection device may comprise a visual line position detection device that adjusts for dynamic corrections of the camera, such as, for example, diopter adjustment as disclosed in commonly assigned U.S. application Ser. No. 08/414,993, filed Mar. 31, 1995, to Kazuharu Imafuji.

The auto focus detection device 6 obtains the defocus amount of the subject based on the light guided by the sub-mirror 5 and performs focus detection of the subject by driving an unpresented auto focus adjustment lens. Prior to the focus detection operation, defocus amounts are obtained for the section of the subject on each of the multiplicity of points distributed according to a rule, explained hereafter, the distance to the section of the subject being measured based upon the defocus amounts and outputting the results to a control device.

With the present embodiment, distance is measured for a point on which auto focus detection is possible using the auto focus detection device 6, but the distance measurement methods of the present invention are not limited to this embodiment. For example, it is equally permissible to project LED light from the camera on the subject with an active auto focus detection device, to use the reflected light to measure distance, and to focus using a focusing means provided separately.

Figure 2A:
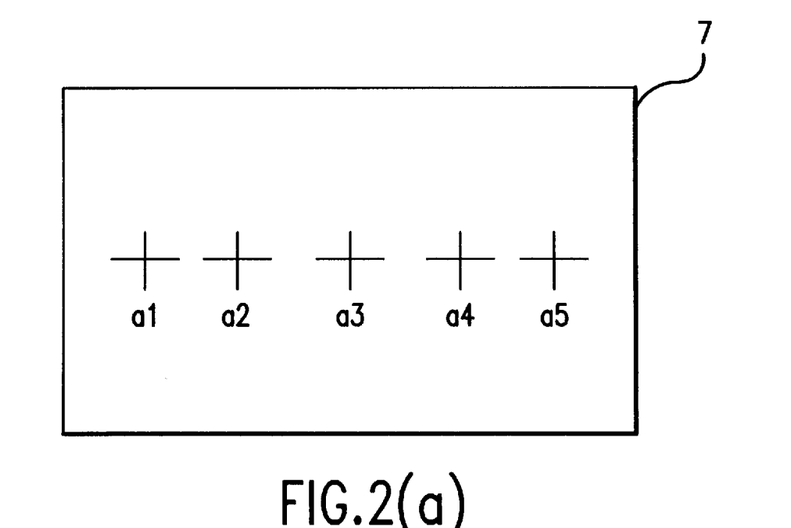
FIGS. 2(a) and 2(b) are illustrations of points on which auto focus detection is possible displayed on a screen of the present invention.
Figure 2B:
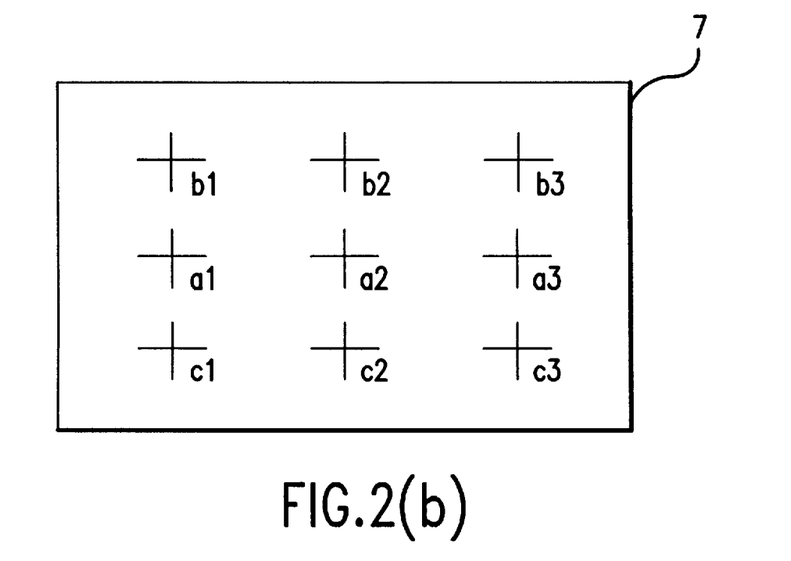

With the present embodiment, in order to indicate to the photographer the positions of points on which focus detection is possible, symbols such as those shown in FIG. 2(a) and FIG. 2(b) are displayed by the liquid crystal display device 8 at locations corresponding to the points on the screen 7 overlapping the subject.

Here, points a1, a2, a3, a4 and a5 illustrated in FIG. 2(a) show positions corresponding to points on which auto focus detection is possible on the screen 7. The present embodiment is structured such that auto focus detection for the subject is performed by the auto focus detection system 6 at one of the points a1, a2, a3, a4 and a5. Another example of display is illustrated in FIG. 2(b). FIG. 2(b) illustrates an example in which the number of points on which auto focus detection is possible is increased, and the symbols corresponding to each point are distributed and located on a two-dimensional plane.

With the present invention, the selection of the point on which auto focus detection is performed, corresponding to one of the points a1, a2, a3, a4 and a5 in FIG. 2(a) or to one of the points a1, a2, a3, b1, b2, b3, c1, c2 and c3, is accomplished by detecting the symbol (point) on which the photographer aligns his vision on the screen 7 with the visual line position detection device 9. In general, a light receiving element to observe the light reflected from the eye 11, for example, a CCD sensor with decomposition capability in one or two dimensions, is provided in the light receiving unit of the visual line position detection device.

With the present embodiment, the visual line position detection device 9 is equipped with a CCD 90 capable of decomposition in one dimension (horizontal direction). In this case, it becomes possible to select points lining up horizontally on which auto focus detection is possible.

Figure 3A:
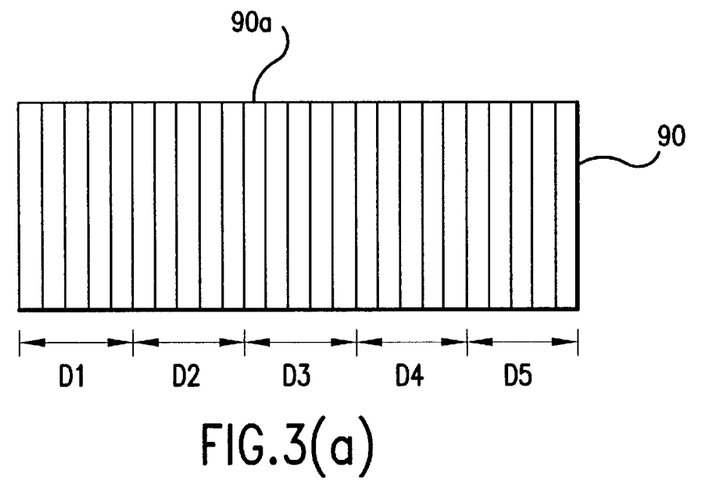
FIGS. 3(a)–3(c) are illustrations of areas established corresponding to the points on which auto focus detection is possible in the light receiving section of the CCD in the visual line detection system of the present invention.

The CCD 90 in the visual line position detection device 9 of the present embodiment has a light receiving section shown in FIG. 3(a). The light receiving section is divided into a plurality of divisions in the direction of the longer side (horizontal), and each division (light receiving division 90a) is able to detect light independently of the other divisions. This structure enables detection of the horizontal direction of the reflected light from the eye 11 of the photographer.

Suppose, for example, the photographer aligns his vision on point a3 on which auto focus detection is possible (i.e., the center of the screen 7 in FIG. 2(a)). Then, the reflected light from the eye 11 of the photographer is observed by one or more light receiving divisions adjacent each other among a multiplicity of light receiving divisions 90a that are located in the specified area D3 in the center of the CCD 90. Furthermore, if the photographer aligns his vision on the edge of the screen 7, such as point a1 or point a5 in FIG. 2(a), the reflected light is observed in area D1 or D5 at the edge of the CCD 90.

In other words, the areas D1–D5 in FIG. 3(a) of the present embodiment show a visual line observation area of the CCD 90 corresponding to points a1–a5 and the vicinity thereof on which auto focus detection is possible in FIG. 2(a). Here, area D1 corresponds to point a1, D2 to a2, D3 to a3, D4 to a4, and D5 to a5, respectively.

According to the present embodiment, the visual line detection device 9 outputs signals containing the position data of the light receiving divisions 90a that detect light, and the microprocessor 12 (see FIG. 6), upon receiving the signal, determines in which area the light receiving divisions 90a detected the light. The areas described above can be varied in the microprocessor 12, and the areas are established such that the area will correspond to the selectable point among all the points on which focus detection is possible.

Determining in which area the light receiving divisions 90a observed the reflecting light can also be accomplished inside the visual line position detection device 9, in which case the data concerning the area where the light is detected are output to the microprocessor 12.

Next, the hardware structure in the present embodiment will be explained.

Figure 6:
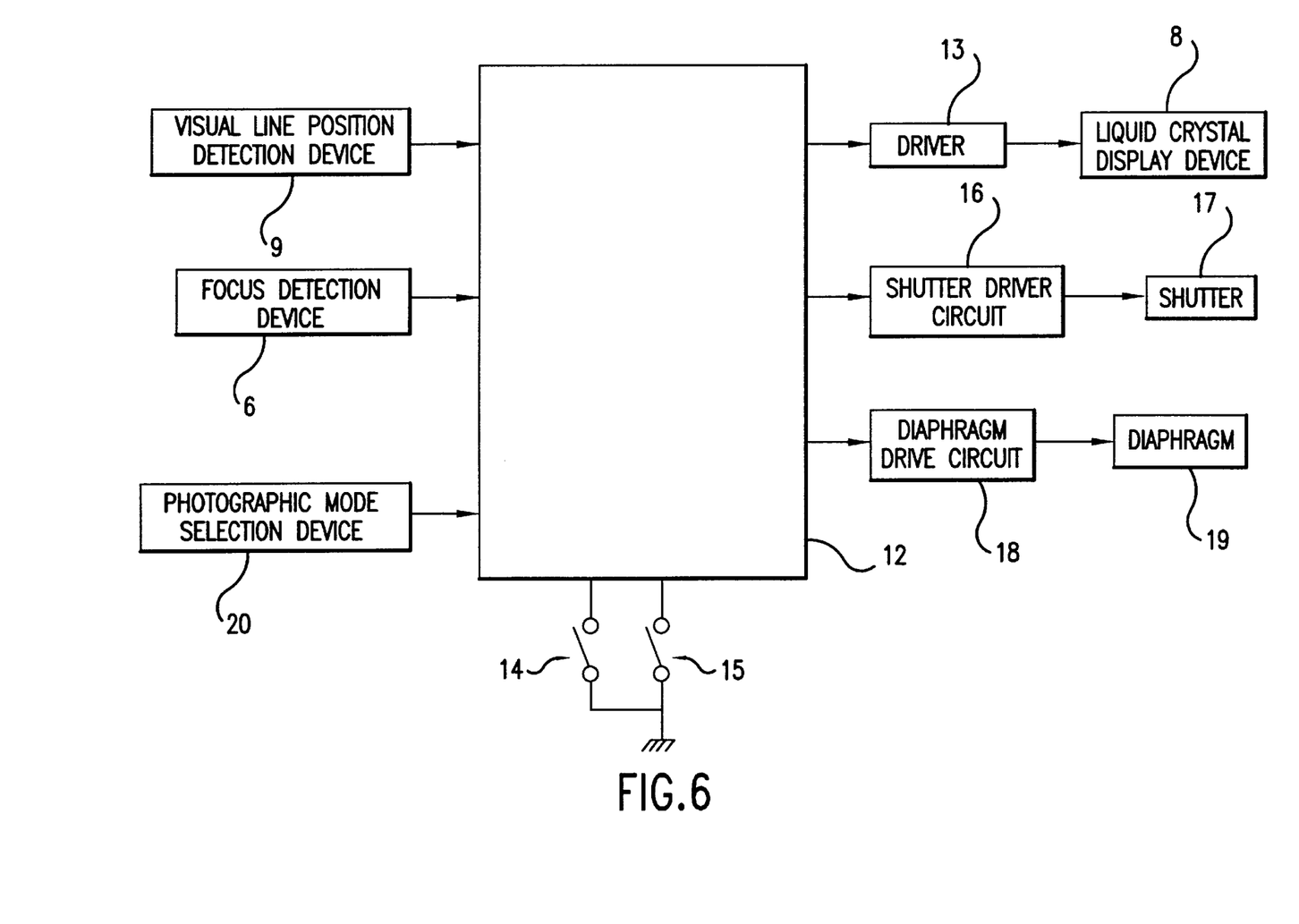
FIG. 6 is a block diagram illustrating the hardware configuration in the embodiment shown in FIG. 1.

As illustrated in the block diagram of FIG. 6, the present embodiment further comprises, in addition to the structure described above, a shooting mode selection device 20 to accept selection of the shooting mode, to be explained later, a photometric distance measuring switch 14 that turns on with the half-depressing of a release button attached to the camera in the present embodiment, and a release switch 15 that turns on with the full depressing of the release button.

The present embodiment further comprises a computer (microprocessor) 12, which controls the shooting operation by receiving shooting mode selection signals from the shooting mode selection device 20, outputs signals from the switches 14 and 15, visual line position data detected by the visual line position detection device 9 showing the visual line position on the screen 7, and focus signals or defocus amounts for each point on which auto focus detection is possible by the focus detection device 6.

The present embodiment further comprises a driver 13 to drive the liquid crystal display device 8, which displays on the screen 7 based on controls by the microprocessor 12, the shutter mechanism 17, which opens during shooting and passes the subject image onto the film surface 4, the shutter driving circuit 16 to drive the front shutter blind and the rear shutter blind of the shutter mechanism 17 when the release switch 15 is turned on according to controls by the microprocessor 12, the aperture mechanism 19 to adjust exposure, and the aperture control circuit 18 to execute stopping and opening of the aperture mechanism 19 according to the control by the microprocessor 12.

The shooting mode selection device 20 accepts settings of shooting operations by the photographer that are executed for each subject and for each shooting operation, and the microprocessor 12 establishes exposure, auto focus, and winding of the camera in accordance with the selected settings.

Here, the shooting mode refers to a multiplicity of predetermined, standard setting modes relating to shooting operations such as exposure, auto focus, and winding of the camera, accommodating different types of desired subjects (portrait and scenery) and various shooting conditions (close-up shooting and shooting of athletic events, etc.). In the present embodiment, the shooting mode matching the type of desired subject and the shooting condition is established manually in the microprocessor 12 beforehand by means of the shooting mode selection device 20, and the camera establishes the shooting operation according to the shooting mode.

For example, if the portrait shooting mode is selected, exposure is set to open the aperture to blur the background of the subject, while auto focus is set to lock the focus after initial focusing until the switch is half-depressed again, and the winding is set to wind one frame at a time.

If the scenery shooting mode is selected, exposure is set to widen the subject field depth by somewhat closing the aperture, while auto focus is set to lock the focus after initial focusing until the switch is half-depressed again, and the winding is set to wind one frame at a time.

If the close-up shooting mode is selected, exposure is set to open the aperture to blur the background of the subject, while auto focus is set to lock the focus after initial focusing until the switch is half-depressed again, and the winding is set to wind one frame at a time.

Next, the operation of the present embodiment is explained.

Figure 4A:
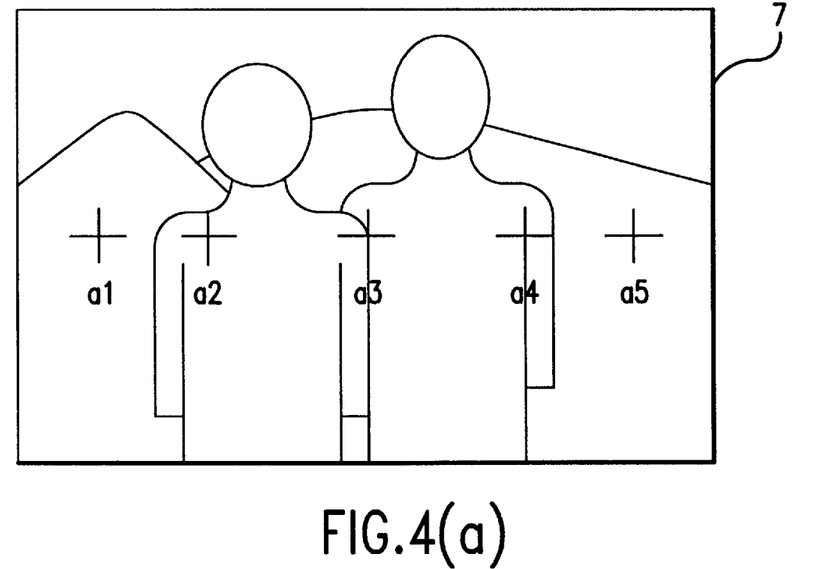
FIGS. 4(a) and 4(b) are illustrations of a subject observed by a photographer looking through the finder in the present invention.
Figure 4B:
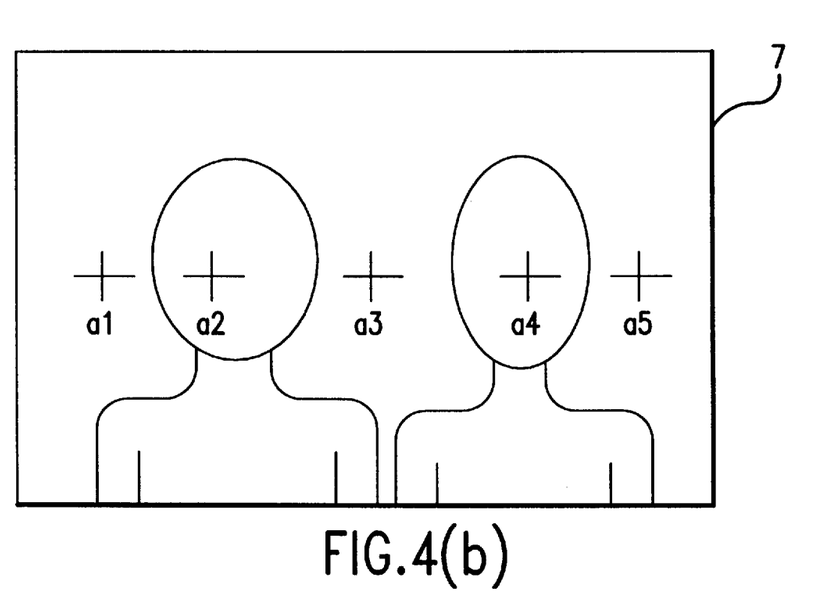

First, the operation of the present embodiment during portrait shooting is explained. FIG. 4(a) and FIG. 4(b) illustrate examples of the screen image observed by a photographer looking through the finder during the shooting of a portrait. Here, the positioning of the points on which auto focus detection is possible is the same as the example shown in FIG. 2(a).

Moreover, for a subject such as that illustrated in FIG. 4(a), an assumption is made here that, among the points a1–a5 on which auto focus detection is possible, the distances to the subject at points a2, a3 and a4 are relatively close, but the distances at a1 and a5 to the subject are very far and can be considered infinite.

Moreover, in the example illustrated in FIG. 4(b), among the points a1–a5 on which auto focus detection is possible, the distances to the subject at points a2 and a4 are relatively close, but the distances at other points are very far and can be considered infinite. Such subjects are commonly known as hollow compositions.

The focusing in the two examples above can be accomplished at one of the points on which auto focus detection is possible that overlaps the main subject of the portrait, namely the points a2, a3 and a4 in FIG. 4(a), and the points a2 and a4 in FIG. 4(b). Focusing is not needed at the points with infinite distance as a result of the distance measurement, namely the points a1 and a5 in FIG. 4(a) and the points a1, a3 and a5 in FIG. 4(b).

In the present invention, the microprocessor 12 selects one point to detect focus based on the results of the distance measurements outputted from the focus detection device 6 and the visual line position data detected by the visual line detection device 9 for all the points on which auto focus selection is possible. However, if some of the points on which auto focus detection is possible are determined to have longer distances than a specified distance, such as infinity as described above, the microprocessor 12 controls the operation of the visual line position detection device 9 so that points with an infinite distance are not selected. The visual line position detection device outputs to a selection device, which is also part of the microprocessor, data specifying points that do not have infinite focus as selectable points. One of those selectable points may be selected for focus detection by the selection device.

Figure 3B:
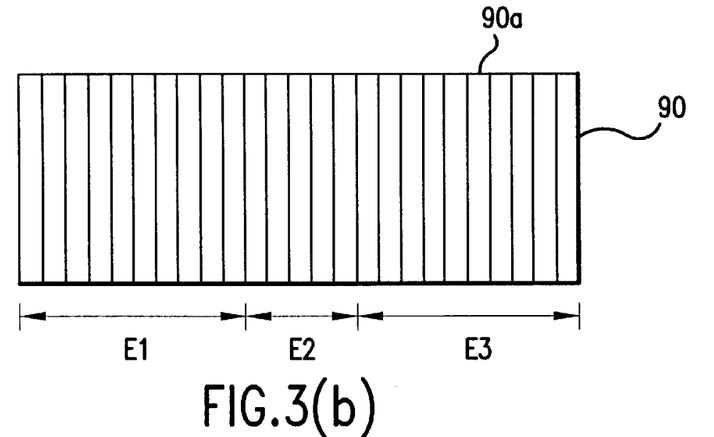

In actuality, in shooting a subject such as that illustrates in FIG. 4(a) in the present embodiment, for example, the microprocessor 12 reestablishes the area in the CCD 90 light receiving section of the light receiving unit of the visual line detection device 9, dividing it into three areas, E1, E2 and E3, as illustrated in FIG. 3(b).

In the example above, the area is established such that the symbol displayed on the screen 7 corresponding to the closest to the visual line position (position of the light receiving division 90a) detected by the visual line position detection device 9 and not having an infinite distance can be selected at any time.

The areas E1, E2 and E3 illustrated in FIG. 3(b) are established to correspond to points a2, a3 and a4, respectively, which are not considered infinite, having distances less than or equal to the specified value. The microprocessor 12 accepts the signals from the visual line position detection device 9 indicating the position of the light receiving division 90a, which detects the light and determines, based on the signals, which area the light receiving division 90a belongs to.

The microprocessor as a selection device further selects the symbol being displayed corresponding to the area to which the light receiving division 90a belongs. The microprocessor 12 then outputs selection signals to the auto focus detection device 6 indicating the point on which focus detection is possible corresponding to the symbol so that focus detection is executed on that point.

Furthermore, the microprocessor 12 lights up and displays on the screen 7, by means of the liquid crystal display system 8, only symbols corresponding to the points among all points on which auto focus detection is possible and that can be selected by the visual line position detection device 9 described above (i.e., only the points not having infinite distance). This enables the photographer to see the positions of the selectable points on which focus detection is possible. Moreover, erroneous visual alignment by the photographer on points with infinite distance is prevented.

Once a point is selected by the visual line position detection device 9, the liquid crystal display device 8 includes the point on which auto focus detection is executed by flashing the selected point based on controls from the microprocessor 12.

With the present embodiment, even if the positions corresponding to points a1 and a5 are selected by erroneous actions of the visual line position detection device 9 when the photographer is visually aligning on points a2, a3 and a4, for example, or even if the positions corresponding to points a1 and a5 are detected due to erroneous visual alignment by the photographer on the vicinity of points with infinite distance, the points a2 and a4 on which auto focus detection is possible will be selected, respectively.

In the case of the subject illustrated in FIG. 4(b), the visual line observation area is reestablished by the microprocessor 12 similarly to the case of FIG. 4(a), and the point on which focus is detected will be selected from the points on which auto focus detection is possible, excepting points for which infinite distance is detected.

Figure 3C:
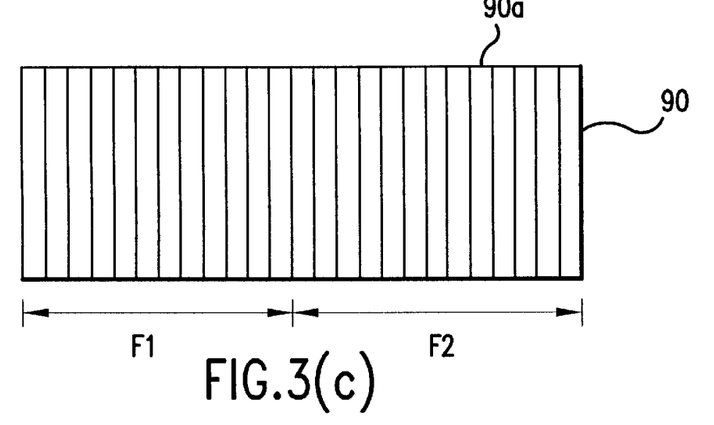

In other words, after dividing and reestablishing the light receiving section CCD 90 into two areas F1 and F2 as illustrated in FIG. 3(c), these areas are made to correspond to symbol points a2 and a4, respectively, which in turn correspond to points on which auto focus detection is possible with a finite distance to the subject. By reestablishing the area in this manner, more accurate focusing is realized even when the photographer erroneously visually aligns on infinite points a1, a3 and a5 or the vicinity thereof, because the points a2 and a4 are respectively selected on which auto focus detection is possible.

As described above, the present embodiment has a structure wherein selection of points that are determined to have infinite distance among points on which auto focus detection is possible is not allowed. Thus, the present embodiment is especially effective for the portrait shooting mode with most cases having large differences in distance between the subject and background scenery among the shooting modes described above.

In the example of a structure described above, a situation is presented in which multiple points where auto focus detection is possible exist, which are determined to have a finite distance, but the present invention is equally effective in a situation in which only one point is determined to have a finite distance. In other words, because only one point is selectable, it is obvious that selection is not necessary in this case.

Therefore, the selection operation of the visual line position detection device 9 is omitted by the control of the microprocessor 12, for example, and focus detection is executed on this point by the automatic focus detection device 9. Such a structure can further shorten the time required through focus detection.

Figure 5:
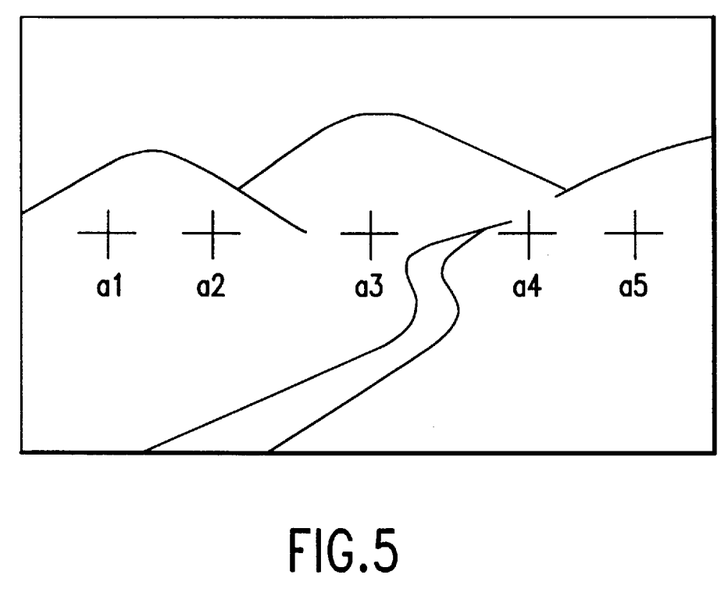
FIG. 5 is an illustration of a subject observed by a photographer looking through the finder in the present invention.

Next, a shooting mode used to photograph scenery is explained. In this case, it is assumed, for example, that a photographer looking through the finder observes the screen image illustrated in FIG. 5. Also, the placement of the points on which auto focus detection is possible is assumed to be like the example illustrated in FIG. 2(a).

For a subject such as above, all the distances measured at points a1–a5 on which auto focus detection is possible usually turn out to be infinite distances. Thus, in focusing there is no need to select a point on which auto focus detection is possible using the visual line position detection device 9.

With the present embodiment, if the microprocessor 12 determines from the result of the distance measurements by the focus detection device 6 that all the points on which auto focus detection is possible are at infinity, the microprocessor 12 omits the selection operation of the points by the visual line position detection device 9 and sets the focus detected by the focus detection device 6 to be infinite. In this example, delay in release caused by unnecessary sequences of operations by the visual line position detection device 9 is prevented.

In this embodiment, whether or not the distance is infinite is determined for all points on which auto focus detection is possible, but the present invention is not limited to the embodiment. For example, when the shooting mode to shoot scenery is selected as the shooting mode, a number of points on which auto focus detection is possible is reduced (use only a2, a3 and a4, for example), and determination of whether or not the distance is infinite is made only for these points. In such a structure, the time required through focus detection can be further reduced.

Figure 7:
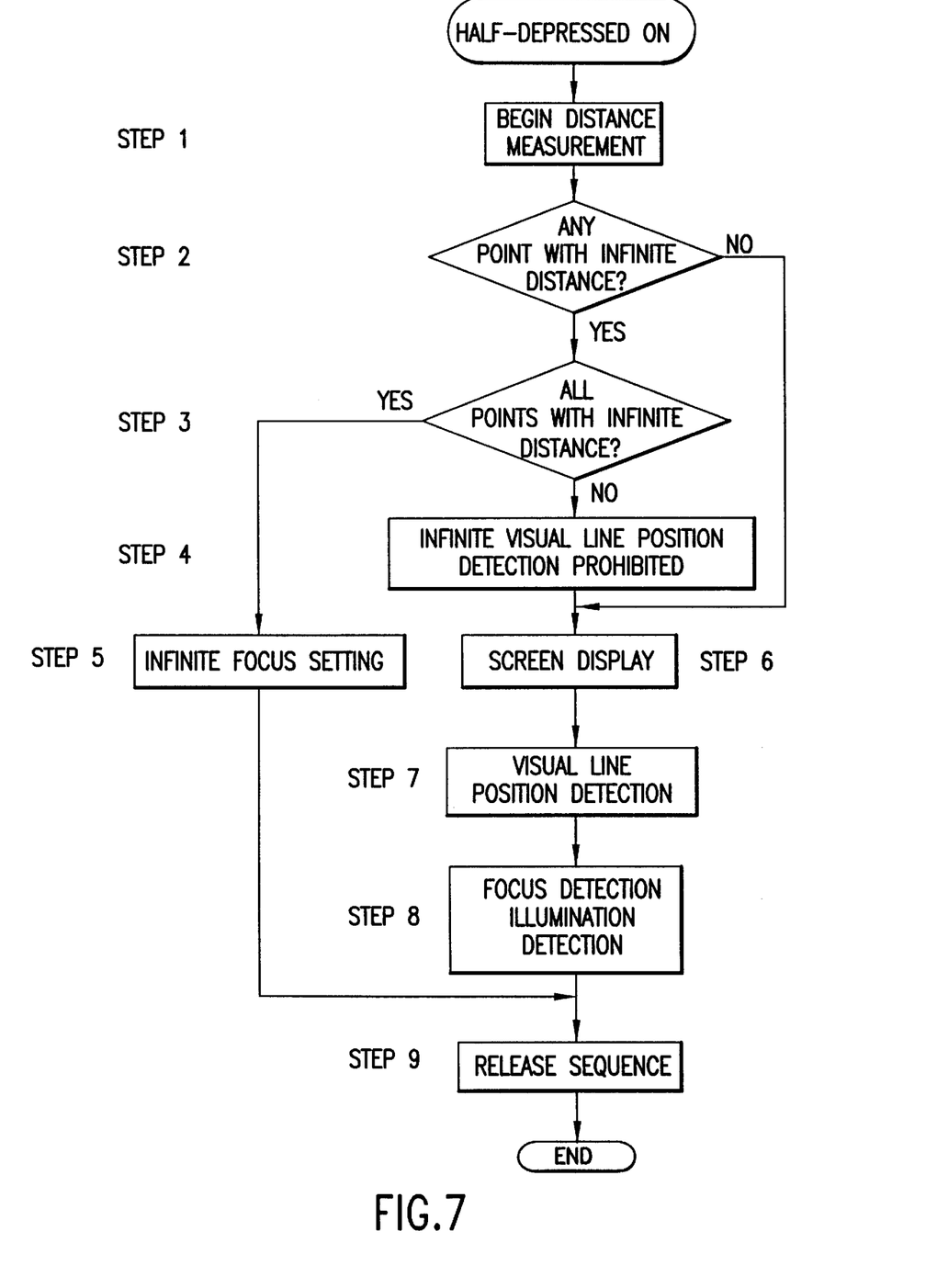
FIG. 7 is a flow chart of a processing operation in the embodiment shown in FIG. 6.

Next, the processing operation of the present embodiment will be explained using a flow chart of FIG. 7.

First, when the release button of the camera is half-depressed and the photometric distance measurement switch 14 is turned on, distance measurement for each point on which auto focus detection is possible is begun one point at a time (STEP 1). Based on the results of the distance measurements in STEP 1, the existence of points on which auto focus detection is possible and that have infinite distance is determined (STEP 2).

If points with infinite distance are found at STEP 2 (Yes for STEP 2), the microprocessor 12 further determines whether all the points on which auto focus detection is possible have infinite distance (STEP 3). If there is no point with infinite distance found at STEP 2 (No for STEP 2), the microprocessor moves to STEP 6.

If all the points on which auto focus detection is possible are found to have infinite distance (Yes for STEP 3), the microprocessor 12 sets the focus of the camera to an infinite focus setting by controlling the auto focus detection device 6 (STEP 5). On the other hand, if not all the points are found to be at infinite distance (No for STEP 3), the microprocessor 12 prohibits selection of infinite points by the visual line position detection device. That is, the area in the CCD 90 of the light receiving unit of the visual line detection device 9 will be reset to correspond to each point that is determined to be finite (STEP 4).

Next, the liquid crystal display device 8 displays symbols on the positions on the screen 7 corresponding to the points that are determined to be finite (i.e., the points for which selection is possible) (STEP 6).

The visual line position detection device 9 detects the photographer visual line position aligning on one of the symbols and, based on the results of the detection, selects the point on which auto focus is performed (STEP 7). Selection of the point is realized by the microprocessor 12 determining in which area, among the areas reestablished in the light receiving section of the CCD 90 in the visual line position detection device 9, the light receiving division 90a detected the light. Moreover, the selected point flashes and is displayed by the liquid crystal display device 8, for example, on the screen 7 so that the photographer can easily recognize it.

The focus detection device 6 detects focus for the point selected at STEP 7 on which auto focus detection is possible and further detects the illumination of the subject using a photometry device (STEP 8). The microprocessor 12 then executes the release sequence at STEP 9.

At the release sequence, the microprocessor waits for the release switch 15 to turn on by a full depressing of the release button and, when the button is turned on, stopping down of the aperture mechanism 18, retracting of the main mirror 1 (mirror up), and opening and closing of the shutter mechanism 17 are executed. Then the shooting operation is completed by restoring the aperture mechanism 18 and the main mirror 1 to their normal positions.

With the present embodiment, if some of the points on which auto focus detection is possible are found to have infinite distance, false detection by the visual line position detection device 9 is prevented by making a structure such that these points are not selected for visual line position detection.

Furthermore, with the present embodiment, if all the points on which auto focus detection is possible have infinite distance, delay in release due to unnecessary operation sequences is prevented by omitting the selection operation by the visual line position detection.

In the present embodiment, display of each point is accomplished: among all the points on which auto focus detection is possible, wherein points that are not selected are not displayed, points that are selectable are lighted up, and the point selected is flashed. Other types of displays may be used in the present invention, provided the difference in attributes of each point can be clearly distinguished and displayed to the photographer.

According to the present embodiment, the CCD 90 capable of detecting position in a one-dimensional direction was used, but the present invention can equally be applied to a case in which a CCD equipped with a light receiving plane capable of position detection in two-dimensional directions is used as illustrated in FIG. 2(b).

Points on which auto focus detection is possible are illustrated in FIG. 2(b) and related areas of the CCD are established. Only the points with a finite measured distance are used to reestablish areas in the CCD so that only those points are displayed as selectable points.

With the present invention, a camera with a visual line position detection device is provided that is capable of shortening the time required through completion of auto focus detection and is capable of more accurate selection of the point intended by the photographer by using the results of distance measurements for the points on which auto focus detection is possible, enabling control of the operation to select the point on which focus detection is executed by the visual line position detection device.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method of operating a camera including a visual line position detection device, said method comprising the steps of:

detecting a photographer visual line position;

performing distance measurements at a plurality of points on a screen where focus detection is possible;

determining whether more than one of said points has a measured distance less than a predetermined distance, and, if so, designating only said points with a lesser measured distance as selectable points for focus detection;

displaying a symbol with a predetermined shape on each position of said screen corresponding to each of said selectable points;

selecting the displayed symbol having the predetermined shape of one of the selectable points based on the detected photographer visual line position; and performing focus detection on said one of said selectable points corresponding to the selected displayed symbol.

2. A method according to claim 1, further comprising the step of selecting, as said one of said selectable points, a point of said selectable points located closest to said detected photographer visual line position.

3. A method according to claim 1, wherein said predetermined distance is considered infinity.

4. A method according to claim 1, wherein if it is determined in said determining step that all of said points where focus detection is possible have infinity focus, said performing step comprising automatically performing focus at infinity.

5. A method according to claim 1, wherein said determining step comprises determining whether more than one point among the points where focus detection is possible has a finite focus distance, and, if there is only one point where focus is possible that has a finite focus distance, said performing step comprising automatically performing focus detection at said one point.

6. A method according to claim 1, further comprising the step of displaying a symbol corresponding to said one of said selectable points in a manner visually distinguishable by said photographer from other displayed symbols.

7. A method according to claim 1, wherein said determining step comprises determining said distance measurements from defocus amounts of each of said points where focus detection is possible.

8. A method according to claim 1, further comprising the steps of:

establishing areas of a detector corresponding to each of said selectable points;

designating one of said areas in accordance with said detected photographer visual line position; and using said designated one of said areas for focus detection.

9. A method according to claim 1, wherein said step of performing distance measurements comprises performing distance measurements on a one-dimensional array of points.

10. A method according to claim 1, wherein said step of performing distance measurements comprises performing distance measurements on a two-dimensional array of points.

11. A method according to claim 1, further comprising the steps of:

selecting a camera photographic mode; and varying the number of points on said screen where focus detection is possible by changing the camera photographic mode.

12. A camera comprising:

a visual line position detection device that detects a photographer visual line position and outputs position data based on the detected visual line position;

a screen on which an image of a subject is formed;

a focus detection device that performs distance measurements at a plurality of points on said screen where focus detection is possible and outputs the results;

a control device that receives said results, said control device determining from said results whether more than one of said points has a measured distance less than a predetermined distance, and, if so, designating only said points with a lesser measured distance as selectable points for focus detection, said control device outputting data specifying said selectable points;

a display device, overlaying said subject image, that receives said data specifying said selectable points, said display device displaying a symbol with a predetermined shape on each position of the screen corresponding to each of said selectable points; and a selection device that receives said data specifying said selectable points and selects the symbol having the predetermined shape, said selection device selecting one of said selectable points having the symbol with the predetermined shape based on said position data output from said visual line position detection device, said selection data outputting said selected one of said selected points to said focus detection device, and said focus detection device performing focus detection on said selected one of said selectable points.

13. A camera according to claim 12, wherein said selection device selects a point of said selectable points located closest to the photographer visual line position detected by said visual line position detection device as said one of said selectable points.

14. A camera according to claim 12, wherein said predetermined distance is considered infinity.

15. A camera according to claim 12, wherein, if said determining step determines that all of said points where focus is possible have infinity focus, said control device controls said focus detection device to perform focus detection at infinity without reliance on said selection device.

16. A camera according to claim 12, wherein said control device determines whether more than one point among the points where focus detection is possible has a finite focus distance, and, if there is only one point where focus is possible that has a finite focus distance, said control device outputs to the focus detection device a selection signal specifying said one point with a finite focus distance as said one of said selectable points for focus detection without reliance on said selection device.

17. A camera according to claim 12, wherein said control device outputs to said display device selection data specifying said selected one of said points, and wherein said display device, upon receiving said selection data, displays a symbol corresponding to said selected one of said points in a manner visually distinguishable by said photographer from other symbols displayed by said display device.

18. A camera according to claim 12, wherein said focus detection device determines said distance measurements from defocus amounts of each point where focus detection is possible and outputs results of said distance measurements.

19. A camera according to claim 12, wherein said focus detection device includes a detector, said control device establishing areas of said detector corresponding to each of said selectable points, said selection device designating one of said areas in accordance with said position data, wherein designated one of said areas is used for focus detection by said focus detection device.

20. A camera according to claim 12, wherein said plurality of points on said screen consists of a one-dimensional array of points.

21. A camera according to claim 12, wherein said plurality of points on said screen comprises a two-dimensional array of points.

22. A camera according to claim 12, further comprising a photographic mode selection device that selects a photographic mode of said camera, wherein a number of points on said screen where focus detection is possible is varied automatically in accordance with different photographic modes.

23. A camera according to claim 12, wherein symbols are only displayed on said screen at positions corresponding to said selectable points.

* * * * *